(12) United States Patent
Sumiyoshi et al.

(10) Patent No.: US 7,701,532 B2
(45) Date of Patent: Apr. 20, 2010

(54) SIGHT CONTROLLABLE DISPLAY DEVICE AND TERMINAL HAVING THE SAME

(75) Inventors: Ken Sumiyoshi, Tokyo (JP); Koji Mimura, Tokyo (JP)

(73) Assignees: NEC Corporation, Tokyo (JP); NEC LCD Technologies, Ltd., Kanagawa (JP)

( * ) Notice: Subject to any disclaimer, the term of this patent is extended or adjusted under 35 U.S.C. 154(b) by 522 days.

(21) Appl. No.: 11/714,144

(22) Filed: Mar. 6, 2007

(65) Prior Publication Data

US 2007/0216829 A1 Sep. 20, 2007

(30) Foreign Application Priority Data

Mar. 14, 2006 (JP) .............................. 2006-070035

(51) Int. Cl.
*G02F 1/1347* (2006.01)
(52) U.S. Cl. ............................... 349/74; 349/13; 349/96
(58) Field of Classification Search ............... 349/74, 349/75, 13, 86, 88, 96; 343/86, 88
See application file for complete search history.

(56) References Cited

U.S. PATENT DOCUMENTS 5,899,551 A * 5/1999 Neijzen et al. .............. 349/115
6,160,534 A * 12/2000 Katakura .................... 345/98

FOREIGN PATENT DOCUMENTS

| JP | 05-173127 | 7/1993 |
|----|-----------|--------|
| JP | 05-323267 | 12/1993 |
| JP | 06-110403 | 4/1994 |

* cited by examiner

*Primary Examiner*—Thoi V Duong
(74) *Attorney, Agent, or Firm*—Young & Thompson

(57) ABSTRACT

To provide a sight controllable display device that is capable of switching a regular display and a concealed display easily. A display panel and a modulator are disposed between two polarizing plates. The display panel performs a regular display drive. Meanwhile, the modulator drives to operate at a speed faster than twice the speed of the display panel and modulate the display image of the display panel. When displaying an image that is desired to be concealed, the period where the modulator is not in action is selected and viewed by a shutter. By stopping the action of the modulator, the regular display can be viewed as it is without the shutter.

11 Claims, 17 Drawing Sheets

SIGHT CONTROLLABLE DISPLAY DEVICE AND TERMINAL HAVING THE SAME

BACKGROUND OF THE INVENTION

1. Field of the Invention

The present invention relates to a sight controllable display device that can be visually recognized only by a specific user and to a terminal that comprises the same.

2. Description of the Related Art

Recently, the number of occasions to handle confidential information on terminals has been increasing. The most typical example of such occasions is the use of a financing terminal, and a personal identification number needs to be imputed for using such financing terminal. Further, it has become very often to handle secret information at offices and the like. Furthermore, there have been an increasing number of opportunities to connect to a network with a mobile telecommunication or at a public place due to an advanced radio technology, which has provided us with more convenience. However, it has also increased the chances for the information that needs to be concealed to be checked on a screen.

Under such circumstances described above, there has been a demand for a sight controllable display device (referred to as "display device" hereinafter) that can be viewed only by the user. It is desirable for such display device to have two display modes. A plurality of people can view an image on the screen with a first display mode, which thereby is referred to as an open mode. Meanwhile, only a specific user can view the image with a second display mode, which thereby is referred to as a concealed mode. Examples of such display device may be those disclosed in Japanese Unexamined Patent Publication H05-173127 (Patent Documents 1), Japanese Unexamined Patent Publication H05-323267 (Patent Documents 2), and Japanese Unexamined Patent Publication H06-110403 (Patent Documents 3). Each of the display devices disclosed in Patent Documents 1, 2, and 3 will be described hereinafter.

Patent Document 1 will be described by referring to FIG. 15. In Patent Document 1, a viewer-side polarizing plate 155b of a liquid crystal display device 150 is attached/detached to/from a display panel 152 in accordance with a display mode. By attaching the polarizing plate 155b on the front face of the display panel 152, a plurality of people can view an image on the screen. This corresponds to the open mode. In the mean time, the image becomes unrecognizable when the polarizing plate 155b is detached from the front face of the display panel 152. This concealed image can be viewed only by a specific user who has attached a polarizing plate 155c. This corresponds to the concealed mode.

Patent Document 2 will be described by referring to FIG. 16. In Patent Document 2, a display device 200 is constituted with a backlight 214, polarizing plates 205a, 205b, liquid crystal panels 220, 221, 222, and the like. Display information is supplied to the liquid crystal panel 220. Meanwhile, signals from a random signal generating circuit 223 are supplied to the liquid crystal panels 221 and 222. The screen of the liquid crystal panel 221 is viewed through glasses that are constituted with the liquid crystal panel 222 and the polarizing plate 205b. The signals from the random signal generating circuit 223 are supplied to the liquid crystal panels 221 and 222 simultaneously, so that the display image modulated in the liquid crystal panel 221 is demodulated in the liquid crystal panel 222. Thus, only the user using the above-described glasses can view the display image on the liquid crystal panel 220.

Patent Document 3 will be described by referring to FIG. 17. In Patent Document 3, one-time display scan is completed with two sub-display periods. The sub-display period is constituted with a half the normal display period. A display image is generated in the first half of the two sub-display periods, and an image obtained by inverting the negative and positive of the display image is generated in the latter half of the sub-display periods. The luminous of the two images are leveled, so that a third party cannot recognize the display image on a display panel 302. In the meantime, by using glasses with a shutter 304 and opening the shutter 304 only in the first half of the sub-display periods, only the display image can be seen from the display panel 302. Thus, the display image can be recognized.

However, there are following issues in the display devices disclosed in Patent Documents 1, 2, and 3.

With Patent Document 1, it is necessary to rearrange the polarizing plate physically when switching from the open mode to the concealed mode. Thus, the display modes cannot be switched easily and frequently. In addition, at the time of the concealed mode, a third party other than the viewer can easily recognize the image by the use of the polarizing plate. Like this, Patent Document 1 has an issue in terms of practicability and concealing property.

With Patent Document 2, the display image can be viewed only by those who can obtain the random signals. Thus, the concealing characteristic of Patent Document 2 is more improved compared to that of Patent Document 1. However, like the case of Patent Document 1, it is still necessary to rearrange the polarizing plate on the surface of the liquid crystal panel for the open mode. Therefore, it is also difficult in this case to switch the modes easily and frequently.

With Patent Document 3, the display image can be recognized only by the viewer who has the synchronized shutter. Further, the display image can be viewed without using the shutter when the same images are formed in the first half and latter half of the display periods. However, it is necessary to shorten the one display period for forming the display image. Thus, a high-speed drive system is required in the display device for obtaining images with high definition. Furthermore, display of the image has to be completed in a half the normal period. Therefore, when using a liquid crystal display device, for example, it is necessary to use the one in which the liquid crystal element operates at a high speed. Particularly, when displaying a moving picture, there requires a high-speed transition of the liquid crystal from a halftone display state to a halftone display state. However, the liquid crystal is known to be slow when transiting from the halftone state to the halftone state. Furthermore, currently, a wide view angle liquid crystal display mode is broadly used in a large-scaled display device. For example, an in-plane switching type, a multi-domain vertical orientation type, and the like are broadly used for the wide view angle liquid crystal display mode. In the current liquid crystal elements capable of such wide view angle display, there is no such type that can respond within a half the normal display period. As described above, regarding Patent Document 3, there is a large restriction in the capacity of the display screen and the liquid crystal display mode. Thus, it is difficult to be put into practical use.

The object of the present invention therefore is to provide a display device which can switch the display modes easily, has high concealing characteristic, and can be applied to a current liquid crystal display device easily.

A display device according to the present invention comprises two polarizing plates opposing with each other, a display panel provided between the two polarizing plates, a modulator provided between the display panel and either one of the two polarizing plates, and an observing shutter. The display panel has a function of forming an image by changing transmittance of light that transmits through the two polarizing plates. The modulator has a function of repeating an inversion mode for inverting an image formed on the display panel and a non-inversion mode for not inverting the image. The observing shutter has a function of repeating a translucent mode for transmitting light and a shielding mode for not transmitting the light in connection with an action of the modulator. For example, the observing shutter turns to the shielding mode when the modulator is in the inversion mode and turns to the translucent mode when the modulator is in the non-inversion mode.

Further, the present invention may be structured as follows.

A first aspect of the present invention is a display device that comprises a laminated unit of a display panel and a modulator provided between polarizing plates, wherein there is a period for operating the modulator within one display period of the display panel, and an observing shutter that operates in connection with the modulator operating period is provided. Through employing the first aspect of the present invention, an open mode and a concealed mode can be easily switched by the on/off setting of the modulator. Further, for the display panel, a regular liquid crystal display panel can be used. With this aspect of the invention, only the modulator requires a high-speed operation. Thus, it is possible to use any display panel in terms of definition, response speed, and the view angle performance.

A second aspect of the present invention is the display device according to the first aspect of the invention, wherein the modulator is constituted to be capable of modulating the birefringence or optical rotation property to be added to the incident light. Through employing the second aspect of the invention, a proper modulator can be selected in accordance with the liquid crystal display mode of the display panel. Particularly, in the case where the display panel is a birefringence control liquid crystal type such as an in-plane switching type, a multi-domain vertical orientation type, and an OCB type, it is possible to use the one that controls the birefringence amount for the modulator. Further, it is possible to constitute the modulator to control the optical rotation property. These modulators can all be constituted with a conventionally well-known liquid crystal element.

A third aspect of the present invention is a display device, wherein the modulator is constituted to be capable of modulating the depolarization characteristic of the incident light. A fourth aspect of the present invention is the display device according to the third aspect of the invention, wherein the modulator is constituted with a compound of a liquid crystal and a polymer. It is understood that the modulator of the third aspect of the invention can be constituted also with an element that has the depolarization characteristic. Particularly, it is understood that the modulator can be constituted with a compound of a conventionally well-known liquid crystal and polymer through employing the fourth aspect of the invention. The compound of the liquid crystal and the polymer requires no orientation film and orientation processing, and it can be formed at a lower cost compared to the modulator shown in the second aspect of the invention.

A fifth aspect of the present invention is the display device according to the first to third aspect of the invention, wherein the modulator is operated by generating a sequence of two values or more for controlling the modulation amount of the modulator. The concealing characteristic can be more improved by employing the fifth aspect of the invention. Since the modulator operates in accordance with a specific sequence, only those who use the shutter that is capable of receiving the sequence can recognize the display image.

A sixth aspect of the present invention is the display device according to the first to fourth aspects of the invention, wherein the modulator is divided into a plurality of segments, and changes the segment to perform modulating action or the modulation amount thereof for each modulation period. The concealing characteristic can be more improved by employing the sixth aspect of the invention. By employing this aspect of the invention, it becomes possible to generate a more complicated image by superimposing the modulator pattern image on the display image. In addition, by changing the pattern image to be superimposed through changing the modulator pattern image in time series, still more complicated image can be generated.

A seventh aspect of the present invention is a terminal that comprises the display device of the first to sixth aspect of the invention loaded thereon. By employing the seventh aspect of the invention, highly confidential information and image can be viewed on an arbitrary terminal without worrying about being looked at by others.

With the present invention, it is possible to switch the open mode and the concealed mode easily by the on/off setting of the modulator. Further, a regular liquid crystal display panel can be used for the display panel. That is, only the modulator requires a high-speed operation. Thus, it is possible to use any display panel in terms of definition, response speed, and the view angle performance.

DETAILED DESCRIPTION OF THE PREFERRED EMBODIMENTS

Now, embodiments of the present invention will be described in detail by referring to the accompanying drawings.

Figure 1:
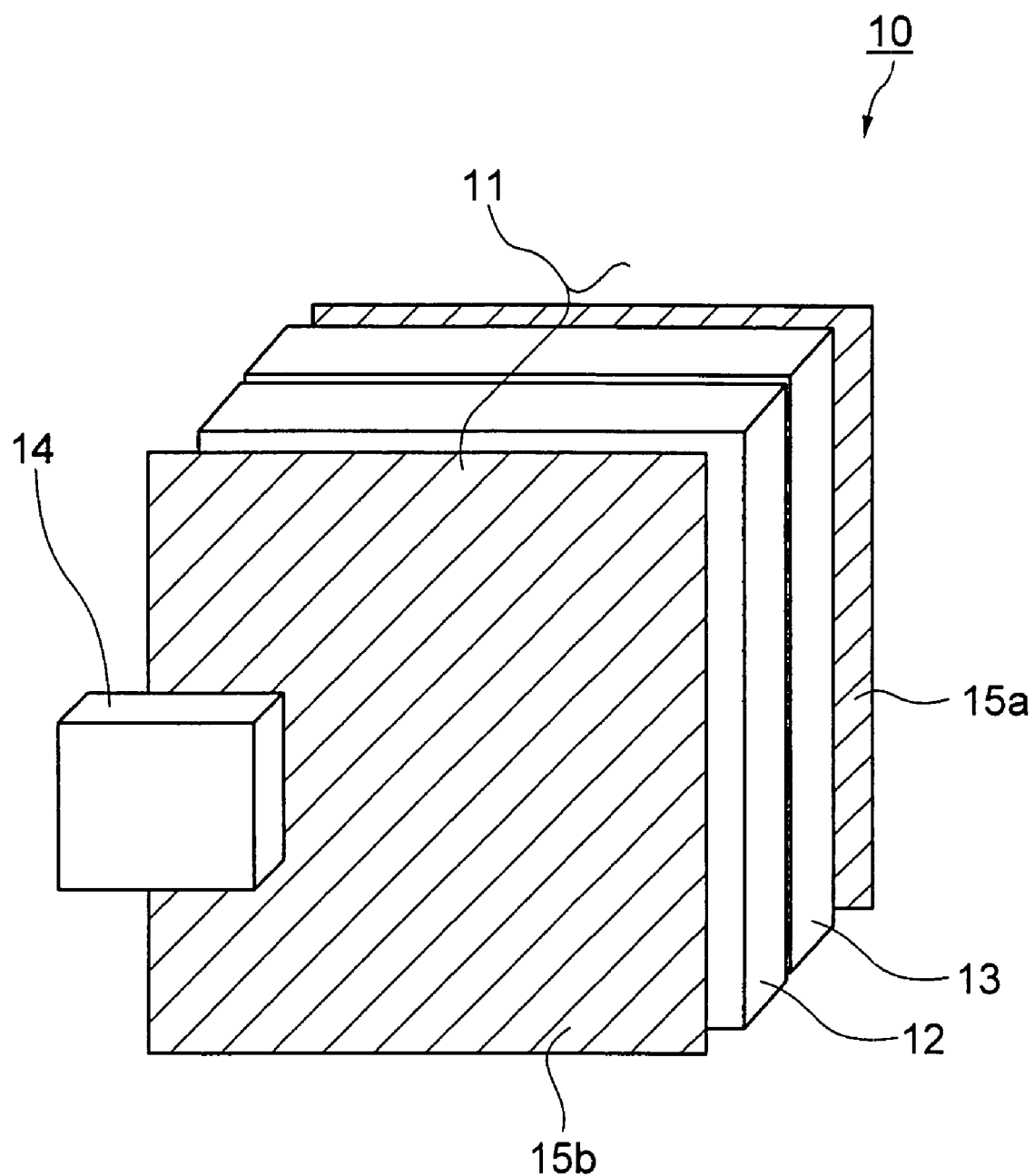
FIG. 1 is a schematic perspective view for showing a first embodiment of a display device according to the present invention.

FIG. 1 is a schematic perspective view for showing a first embodiment of the display device according to the present invention. An explanation will be provided hereinafter by referring to this drawing.

A display device 10 of the embodiment comprises a laminated unit of a display panel 12 and a modulator 13 provided between polarizing plates 15a and 15b. There is provided a period for operating the modulator 13 within one display period of the display panel 12, and the display device 10 is provided with a shutter 14 that operates in connection with the operating period of the modulator. That is, the display device 10 is constituted with a display unit 11 and the shutter 14. The display unit 11 is formed by laminating the regular display panel 12 and the modulator 13 between the two polarizing plates 15a and 15b. The display panel 12 and the modulator 13 are formed almost in the same size. Thus, the modulator 13 may be called a modulator panel. The modulator 13 is arranged behind the display panel 12 in this embodiment. However, inversely, the display panel 12 may be arranged behind the modulator 13. Each of the display panel 12, the modulator 13, and the shutter 14 comprises a control circuit (not shown).

A liquid crystal display panel is used as the display panel 12. A liquid crystal element within the liquid crystal display panel exhibits the transmittance in accordance with the applied voltage. For example, a twisted nematic liquid crystal element exhibits a high transmittance when no voltage is applied, and exhibits a low transmittance when a voltage is applied. Normally, the state with no voltage being applied (normal state) is used, so that this is referred to as a normally white type. In the meantime, the in-plane switching type and the multi-domain vertical orientation type exhibit a low transmittance when no voltage is applied, and exhibit a high transmittance when a voltage is applied. This is referred to as a normally black type. The display panel 12 can be used for both the normally white type and normally black type.

Similarly, the modulator 13 also affects the optical characteristic. The modulator 13 can have two kinds of characteristics in accordance with its type. When it becomes optically active while the modulator 13 is in action and becomes optical inactive while the modulator 13 is not in action, it is called a normally-off modulator 13. Inversely, when it becomes optically inactive while the modulator 13 is in action and becomes optically active while the modulator 13 is not in action, it is called a normally-on modulator 13.

Figure 2:
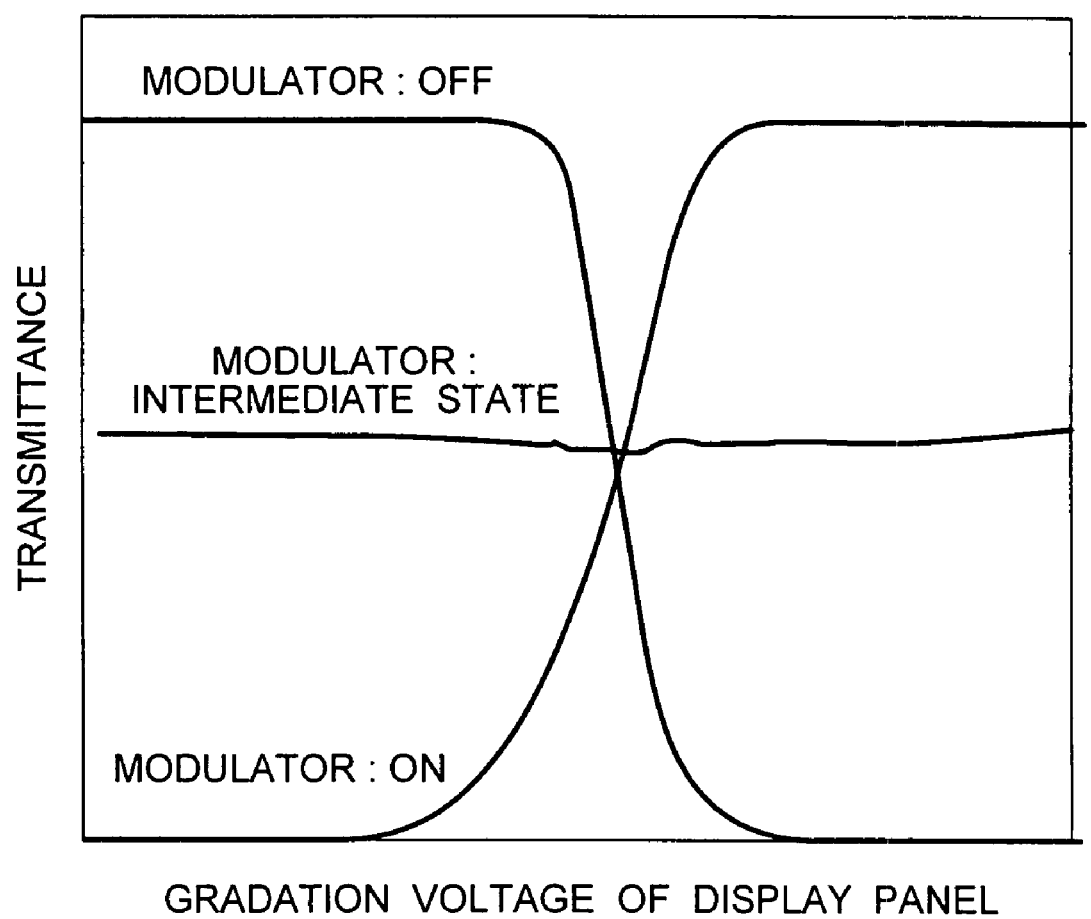
FIG. 2 is a graph for showing a transmittance characteristic of the case where a normally-white liquid crystal element and a normally-off modulator are combined.

Display of the display unit 11 is determined depending on a combination of the actions of the display panel 12 and the modulator 13. FIG. 2 shows the transmittance characteristic of the case where a normally-white liquid crystal element and a normally-off modulator are combined. The horizontal axis is the voltage applied to the liquid crystal element within the display panel 12, and the longitudinal axis is the transmittance of the entire display unit 11. Further, the degree of the optical activeness of the modulator 13 is shown as a parameter.

In this embodiment, display images are read out by using the shutter 14. The shutter 14 may be formed in an eyeglass-type or a card type. Such shutter 14 can be constituted by disposing a liquid crystal element or the like between two polarizing plates, for example.

In FIG. 2, the original voltage-transmittance characteristic of the liquid crystal element is shown when the modulator 13 is optically inactive. Meanwhile, the original voltage-transmittance characteristic of the liquid crystal element is modulated when the modulator 13 is optically active. Thus, the display image becomes extremely difficult to be recognized visually.

Figure 3:
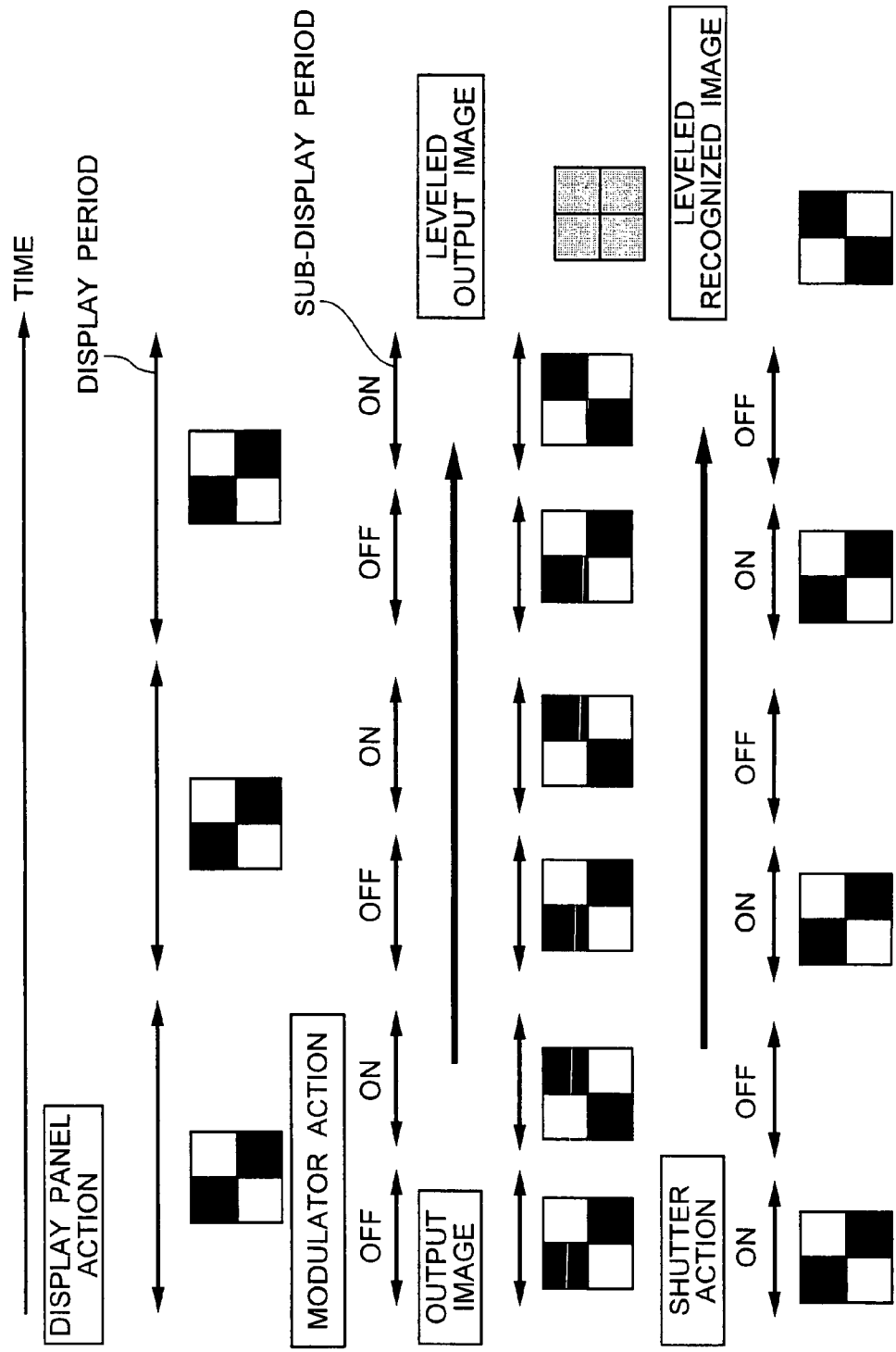
FIG. 3 is a time chart for showing a first example of the display action of the first embodiment.

FIG. 3 is a time chart for showing the actions of the display panel 12 and the modulator 13 in time series. The display panel 12 generates a display image in a regular display period. In the meantime, the modulator 13 operates at a higher speed than the display period of the display panel 12. FIG. 3 shows the case where the modulator 13 operates in a sub-display period that is a half the display period. From FIG. 2, it can be seen that the regular display image can be viewed in the sub-display period where the modulator 13 is not in action. Meanwhile, it can be seen from FIG. 2 that an inverted image of the regular display image can be viewed in the sub-display period where the modulator 13 is in action. Thus, the images of the two sub-display periods are leveled and the image cannot be recognized when the shutter 14 is not used. In the meantime, when the shutter 14 is synchronized with the sub-display period where the modulator 13 is not in action as illustrated simultaneously in FIG. 3, only the regular display image transmits through the shutter 14. Therefore, the display image can be recognized.

Figure 4:
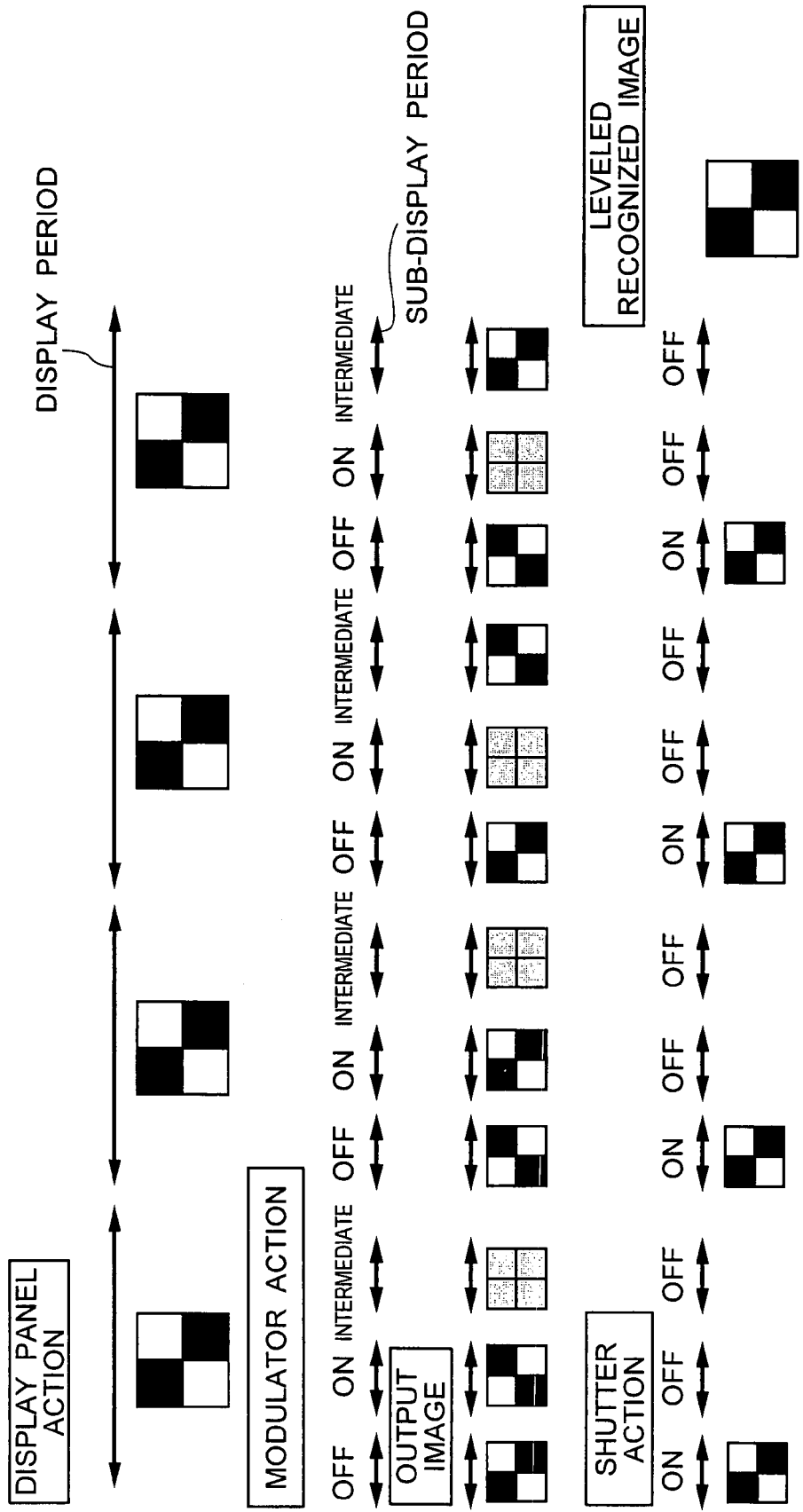
FIG. 4 is a time chart for showing a second example of the display action of the first embodiment.

FIG. 4 shows the case where the modulator 13 operates in a sub-display period that is one third of the display period. The modulator 13 in this case is set to be in the off-state of FIG. 2 in a first sub-display period, in the on-state of FIG. 2 in a second sub-display state, and in the intermediate state of FIG. 2 in a third sub-display period. As a result, a normal display image can be obtained only when the shutter 14 is synchronized with the first sub-display period.

The above is an explanation of the action at the time of concealed mode. In the open mode, the modulator 13 is always in an inactive state. Thus, a regular display image can be obtained from the display unit 11.

In short, it can be described as follows. The display panel 12 and the modulator 13 are disposed between the two polarizing plates 15a and 15b. The display panel 12 performs a regular display drive. Meanwhile, the modulator 13 drives to operate at a speed faster than twice the speed of the display panel 12 and modulate the display image of the display panel 12. When displaying an image desired to be concealed, the period where the modulator 13 is not in action is selected by the shutter 14 to be viewed. By stopping the action of the modulator 13, the regular display can be viewed as it is without the shutter 14.

Figure 5:
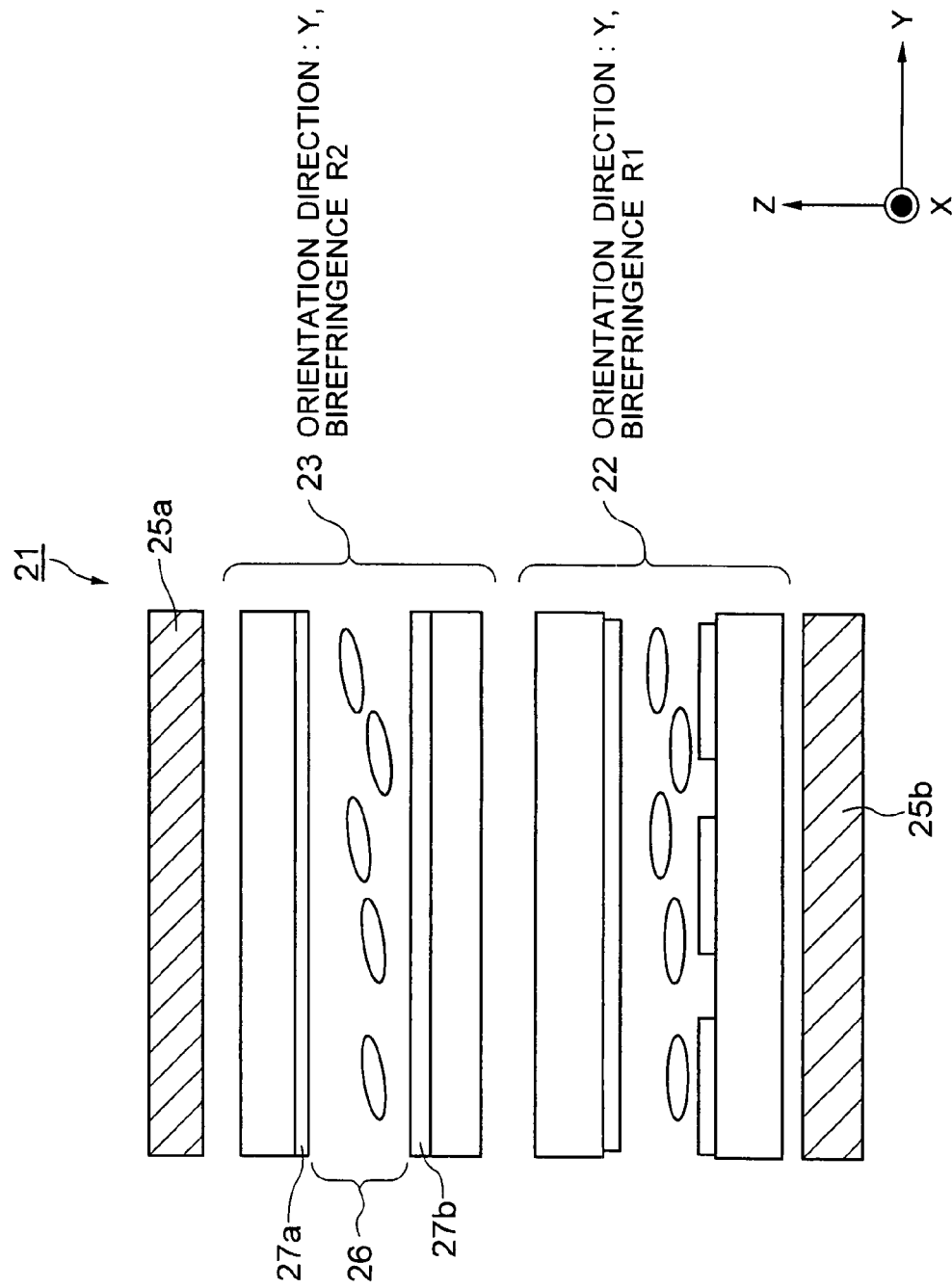
FIG. 5 is a schematic cross section for showing a second embodiment of the display device according to the present invention.

FIG. 5 is a schematic cross section for showing a second embodiment of the display device according to the present invention. An explanation will be provided hereinafter by referring to this drawing.

A display unit 21 of this embodiment comprises a modulator 23 that is capable of modulating the birefringence amount or the optical rotation property added to incident light. Such modulator 23 can be constituted with a modulator that can modulate the birefringence amount at a high speed or a modulator that can modulate the optical rotation property at a high speed. FIG. 5 shows the case of modulating the birefringence amount. The same shutter as that of the first embodiment is employed herein, although it is not illustrated in the drawing.

A display panel 22 comprises three layers, i.e. a common electrode, a liquid crystal layer, and a pixel electrode, which are sandwiched between two transparent substrates. The display panel 22 performs display action by controlling birefringence R1. Specific examples of the display panel 22 may be a liquid crystal element of in-plane switching type, a liquid crystal element of vertical orientation type, etc.

The modulator 23 comprises three layers, i.e. a transparent electrode 27a, a liquid crystal layer 26, and a transparent electrode 27b, which are sandwiched between two transparent substrates. The modulator 23 can control birefringence R2. The actions shown in FIG. 3 and FIG. 4 can be achieved through inserting the display panel 22 and the modulator 23 between the two polarizing plates 25a and 25b. FIG. 5 shows the case where the two polarizing plates 25a and 25b are arranged with the transmission axes being orthogonal to each other. Black display can be obtained when the birefringence amounts for the both plates are zero (R1=0 and R2=0). In the meantime, white display can be obtained when the modulator 23 is not operated (R2=0) and R1 is set as about a half of the display optical wavelength. Like this, the case where the display action is carried out when R2=0 corresponds to the off-state of the modulator shown in FIG. 2.

The total birefringence of the display unit 21 is R1+R2. From this, it can be found that white display can be obtained with R=0 by setting R2 to be about a half the wavelength. Black display can be obtained by setting R2 to be about a half the wavelength and setting R1 to be about a half the wavelength as well. This corresponds to the on-state of the modulator shown in FIG. 2.

Figure 6:
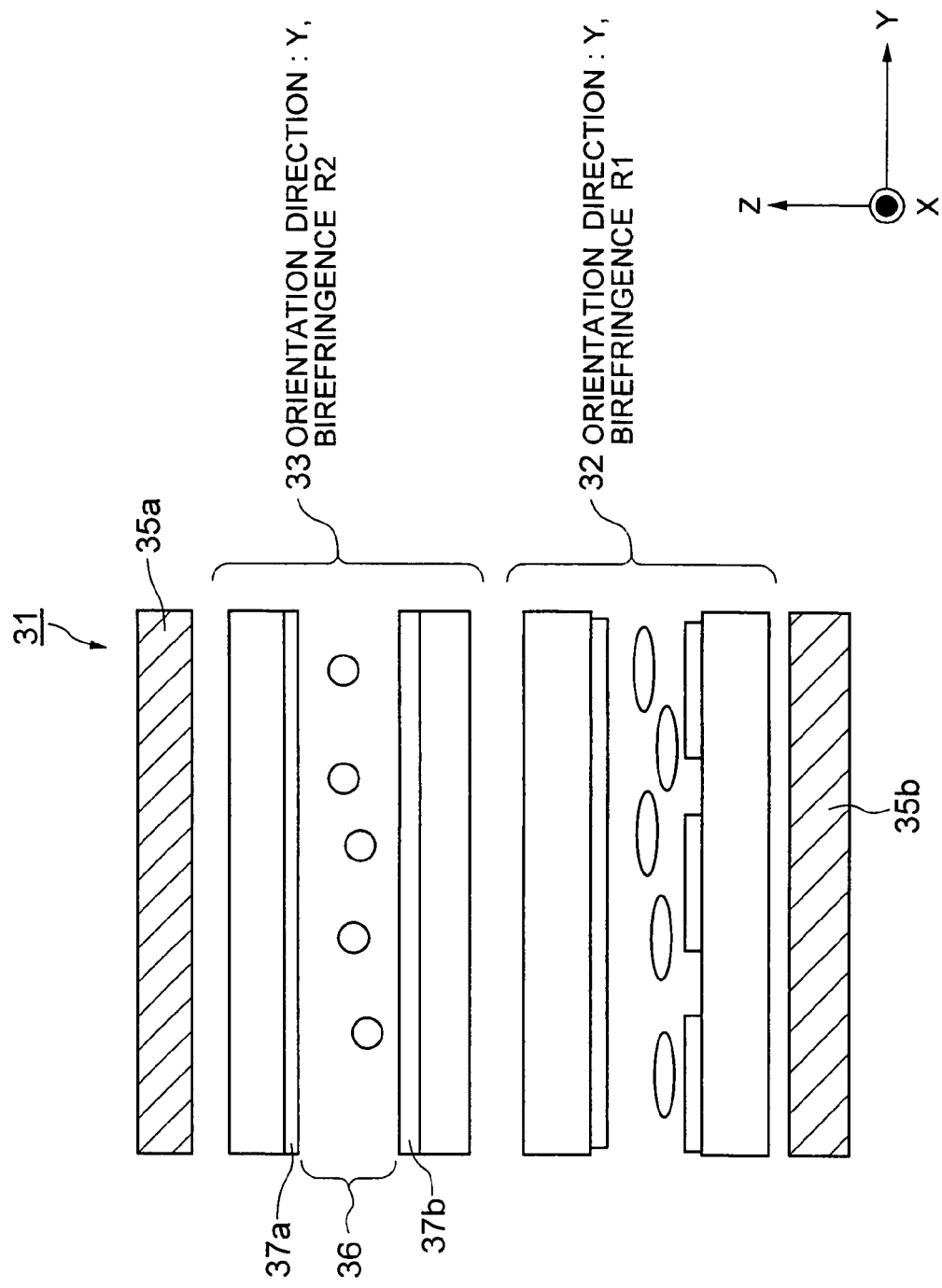
FIG. 6 is a schematic cross section for showing a third embodiment of the display device according to the present invention.

FIG. 6 is a schematic cross section for showing a third embodiment of the display device according to the present invention. An explanation will be provided hereinafter by referring to this drawing.

In a display unit 31 of this embodiment, a display panel 32 and a modulator 33 are disposed in such a manner that the birefringence directions of the two are orthogonal to each other. Thus, the total birefringence of the display unit 31 becomes R1−R2. Therefore, when the modulator 33 is in an off-state (R2=0), the black display is obtained with R1=0, and the white display is obtained when R1 is about a half the wavelength. This corresponds to the off-state of the modulator shown in FIG. 2. Meanwhile, when the modulator 33 is in an on-state (R2 is about a half the wavelength), the white display is obtained with R1=0, and the black display is obtained when R1 is about a half the wavelength.

The modulator 33 comprises three layers, i.e. a transparent electrode 37a, a liquid crystal layer 36, and a transparent electrode 37b, which are sandwiched between two transparent substrates. The display panel 32 comprises three layers, i.e. a common electrode, a liquid crystal layer, and a pixel electrode, which are sandwiched between two transparent substrates. The modulator 33 and the display panel 32 are provided between two polarizing plates 35a and 35b. The same shutter as that of the first embodiment is employed, although it is not shown in the drawing.

Figure 7:
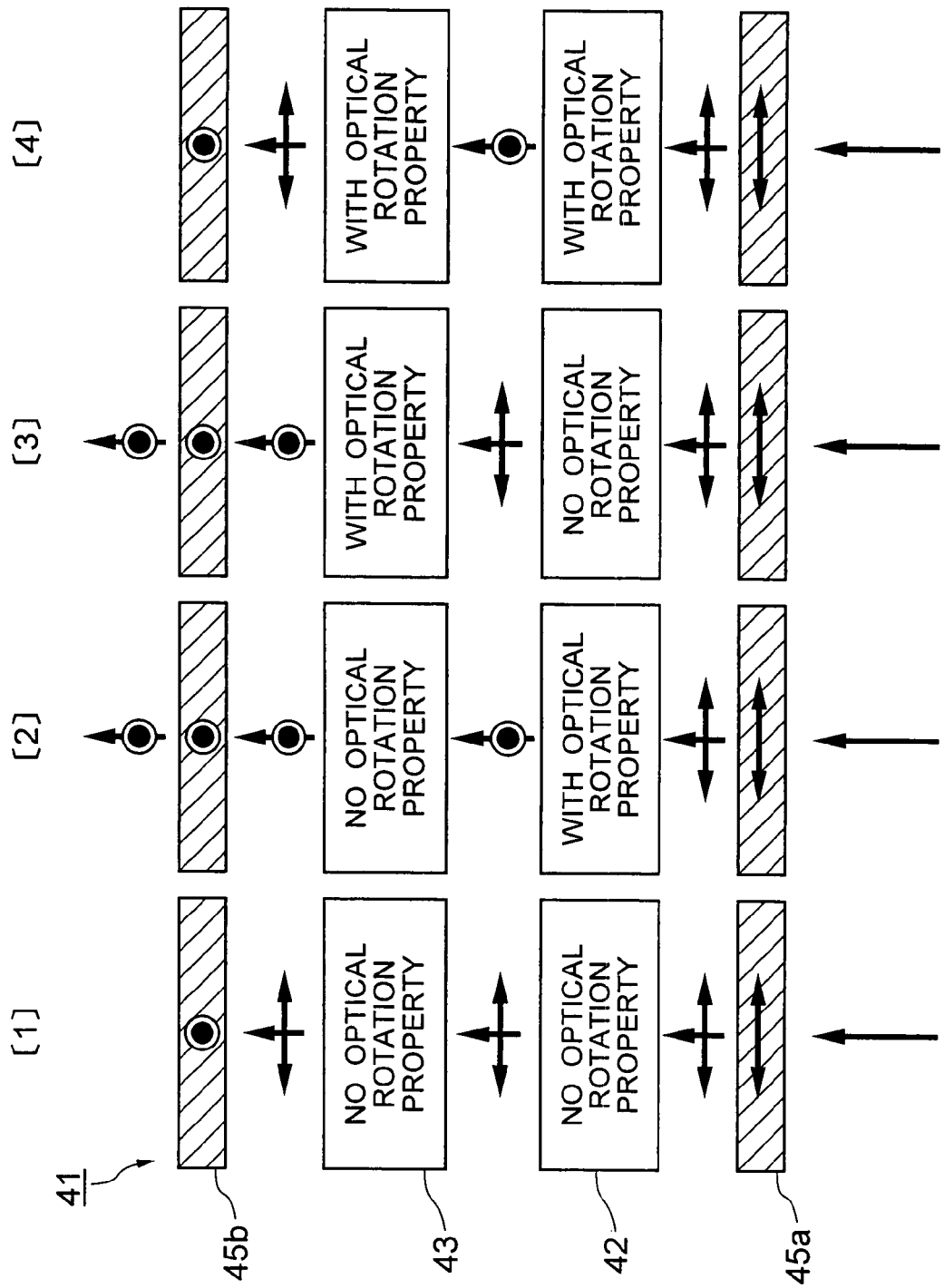
FIG. 7 is a schematic model illustration for showing a fourth embodiment of the display device according to the present invention.

FIG. 7 is a schematic model illustration for showing a fourth embodiment of the display device according to the present invention. An explanation will be described hereinafter by referring to this drawing.

A display unit 41 of this embodiment comprises a modulator 43 that is capable of modulating the optical rotation property. A display panel 42 either has the optical rotation property optically or cancels it to perform display. Specific example thereof may be a twisted nematic liquid crystal element and the like. The modulator 43 also controls the optical rotation property. Thus, when the display panel 42 and the modulator 43 are disposed between polarizing plates 45a and 45b whose transmission axes are orthogonal to each other, white display can be obtained (FIG. 7B) if the display panel 42 has the optical rotation property and the modulator 43 has no optical rotation property. Black display can be obtained (FIG. 7A) if the display panel 42 has no optical rotation property and the modulator 43 has no optical rotation property, either. This corresponds to the off-state of the modulator shown in FIG. 2. In the meantime, black display can be obtained (FIG. 7D) if the display panel 42 has the optical rotation property and the modulator 43 has the optical rotation property as well, and white display can be obtained (FIG. 7C) if the display panel 42 has no optical rotation property and the modulator 43 has the optical rotation property. This corresponds to the on-state of the modulator shown in FIG. 2. The same shutter as that of the first embodiment is employed, although it is not shown in the drawing.

Figure 8:
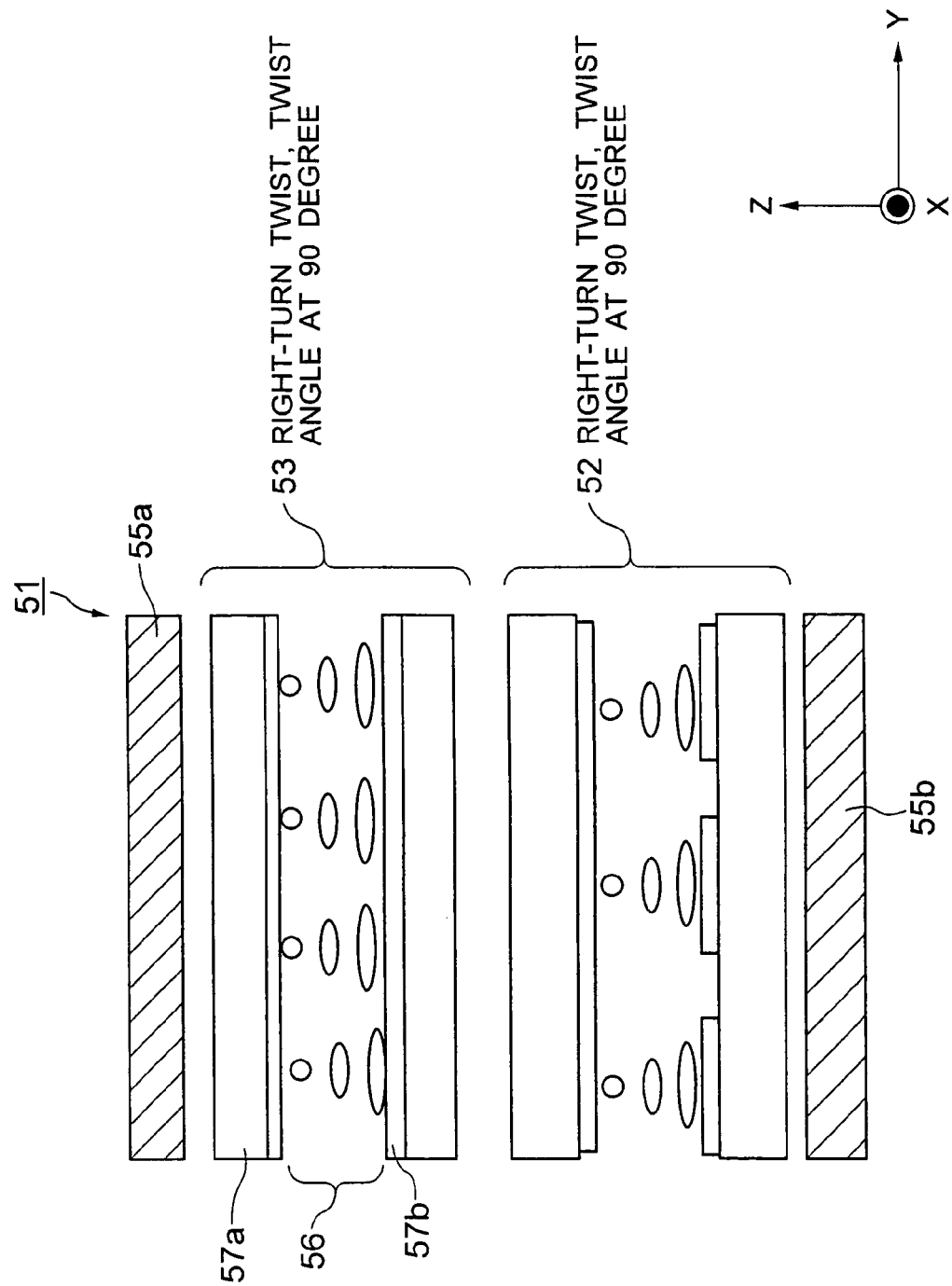
FIG. 8 is a schematic cross section for showing a specific structural example (first example) that embodies the fourth embodiment.

FIG. 8 is a schematic cross section for showing a specific structural example (first example) that embodies the fourth embodiment. An explanation will be described hereinafter by referring to this drawing.

This embodiment is the aforementioned specific structural example that embodies the fourth embodiment. In this embodiment, a display panel 52 comprises a twisted nematic liquid crystal layer and a modulator 53 also comprises a twisted nematic liquid crystal layer, wherein each of the twist directions thereof faces in the same direction.

The modulator 53 comprises three layers, i.e. a transparent electrode 57a, a liquid crystal layer 56, and a transparent electrode 57b, which are sandwiched between two transparent substrates. The display panel 52 comprises three layers, i.e. a common electrode, a liquid crystal layer, and a pixel electrode, which are sandwiched between two transparent substrates. In a display unit 51, the modulator 53 and the display panel 52 are provided between two polarizing plates 55a and 55b. The same shutter as that of the first embodiment is employed, although it is not shown in the drawing.

Figure 9:
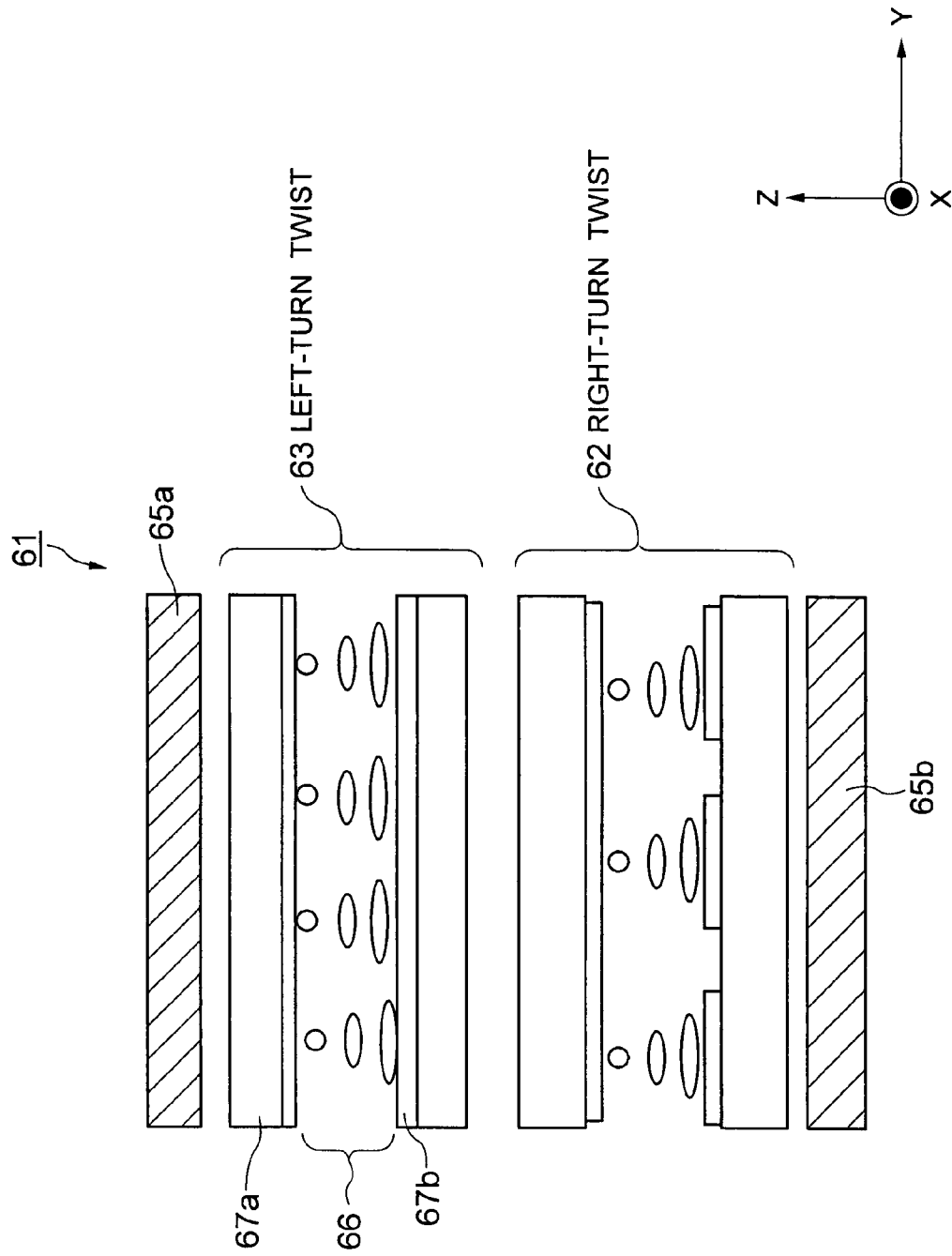
FIG. 9 is a schematic cross section for showing a specific structural example (second example) that embodies the fourth embodiment.

FIG. 9 is a schematic cross section for showing a specific structural example (second example) that embodies the fourth embodiment. An explanation will be described hereinafter by referring to this drawing.

This embodiment is the aforementioned specific structural example that embodies the above-described fourth embodiment. In this embodiment, the twisted nematic liquid crystal layer of a display panel 62 and that of a modulator 63 are twisted in reverse directions from each other.

The modulator 63 comprises three layers, i.e. a transparent electrode 67a, a liquid crystal layer 66, and a transparent electrode 67b, which are sandwiched between two transparent substrates. The display panel 62 comprises three layers, i.e. a common electrode, a liquid crystal layer, and a pixel electrode, which are sandwiched between two transparent substrates. In a display unit 61, the modulator 63 and the display panel 62 are provided between two polarizing plates 65a and 65b. The same shutter as that of the first embodiment is employed, although it is not shown in the drawing.

Next, a fifth embodiment of the display device according to the present invention will be described. The display device of this embodiment is characterized to have a modulator that is capable of modulating the depolarization characteristic of the incident light. In this embodiment, the modulator operates as a depolarization device to control the depolarization degree. That is, when aligned linearly polarized light makes incident on this modulator, the light can be transmitted as unpolarized light or can be taken out as the original linearly polarized light. In the case where this modulator is used in the structure shown in FIG. 1, the regular image can be obtained when the modulator does not perform depolarization. However, it is not possible to obtain a recognizable image when the modulator performs depolarization. Thus, an unrecognizable image is mixed with the action as shown in FIG. 2, so that the visibility of the image on the entire display unit becomes deteriorated extremely. The visibility is deteriorated further if the first sub-display period in FIG. 2 is set shorter and the second sub-display period is set longer.

As the modulator of this embodiment for controlling the depolarization characteristic, it is possible to use a layer that is constituted with a compound of a liquid crystal and a polymer. The compound of the liquid crystal and polymer has a fine structure in which the polymer phase and the liquid crystal phase are involved in a complicated manner. Thus, when linearly polarized light in a specific direction makes incident thereon, the birefringence amount received at each fine structure becomes different. As a result, unpolarized light is outputted as the emitted light. When a voltage is applied to such compound of the liquid crystal and polymer, the liquid crystal molecules rise in a normal direction of the substrate. Therefore, the modulator comes to exhibit no birefringence characteristic to the incident light, thereby having no depolarization characteristic.

Figure 10:
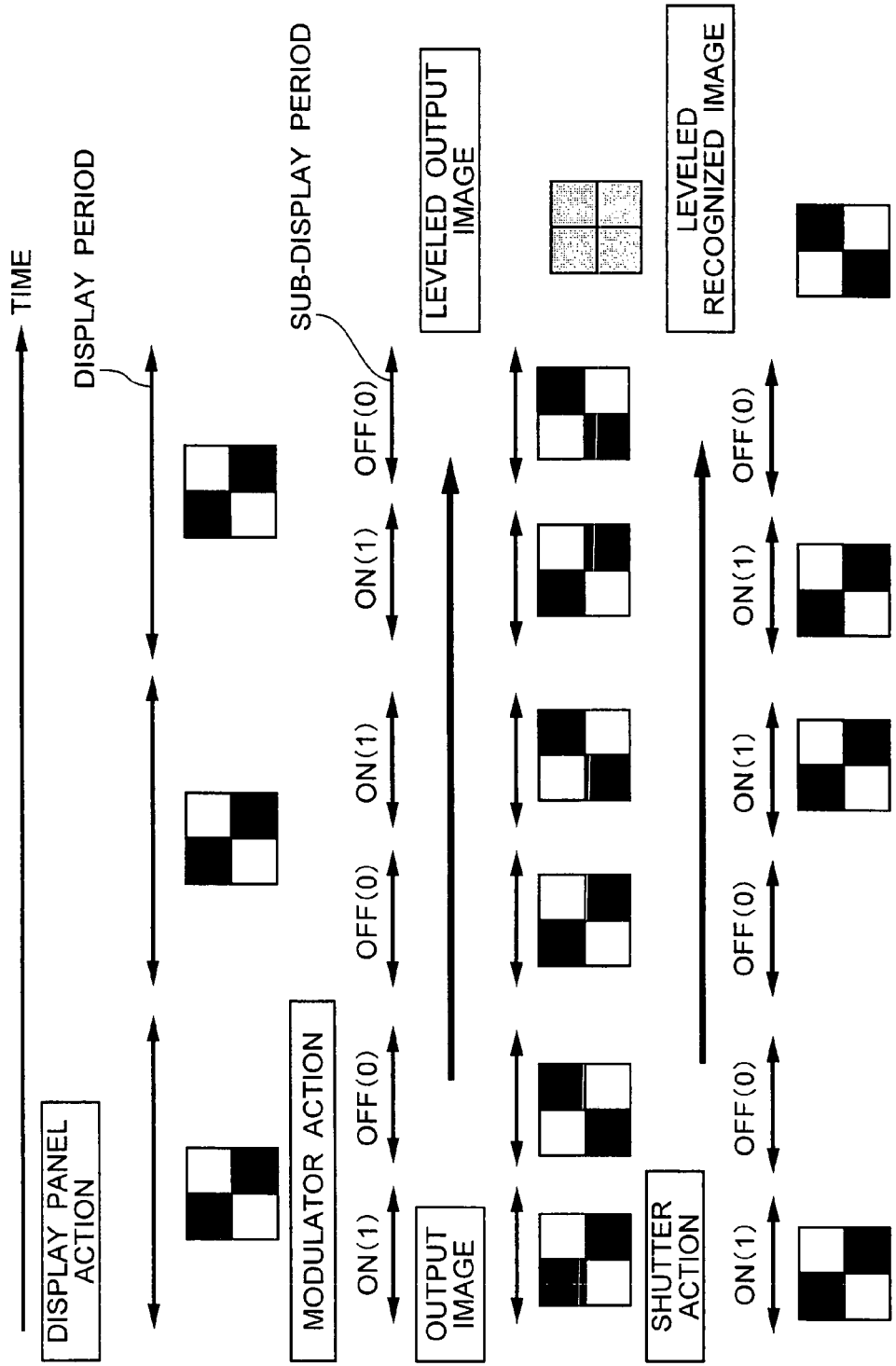
FIG. 10 is a timing chart for showing the display action (first example) of a sixth embodiment of the display device according to the present invention.

Next, a sixth embodiment of the display device according to the present invention will be described. The display device of this embodiment is characterized that a modulator is operated by generating a sequence of two values or more for controlling the modulation amount of the modulator. In FIG. 2 and FIG. 3, the sub-display period with which the shutter synchronizes is necessarily at the front of the display period of the display panel. In this embodiment, however, as shown in FIG. 10, whether the sub-display period where the modulator turns off comes in the first half or the latter half of the display period of the display panel is determined depending on the sequence inputted to the modulator. For example, in FIG. 10, binary signals generated in a sequence are inputted to the modulator. It is assumed here that the binary signals are {1, 0, 0, 1, 1, 0, 0, 1}, for example. In this case, the modulator turns on in the first sub-display period and turns off in the second sub-display period based on two signals {1,0} from the front. In the next display period, the modulator turns off in the first sub-display period and turns on in the second sub-display period based on the third and fourth binary signals {0,1}. Thus, it is necessary to change the selection of the first and the second sub-display periods for each display period. Therefore, only the shutter that is capable of receiving the sequence signals can generate a normal image.

Figure 11:
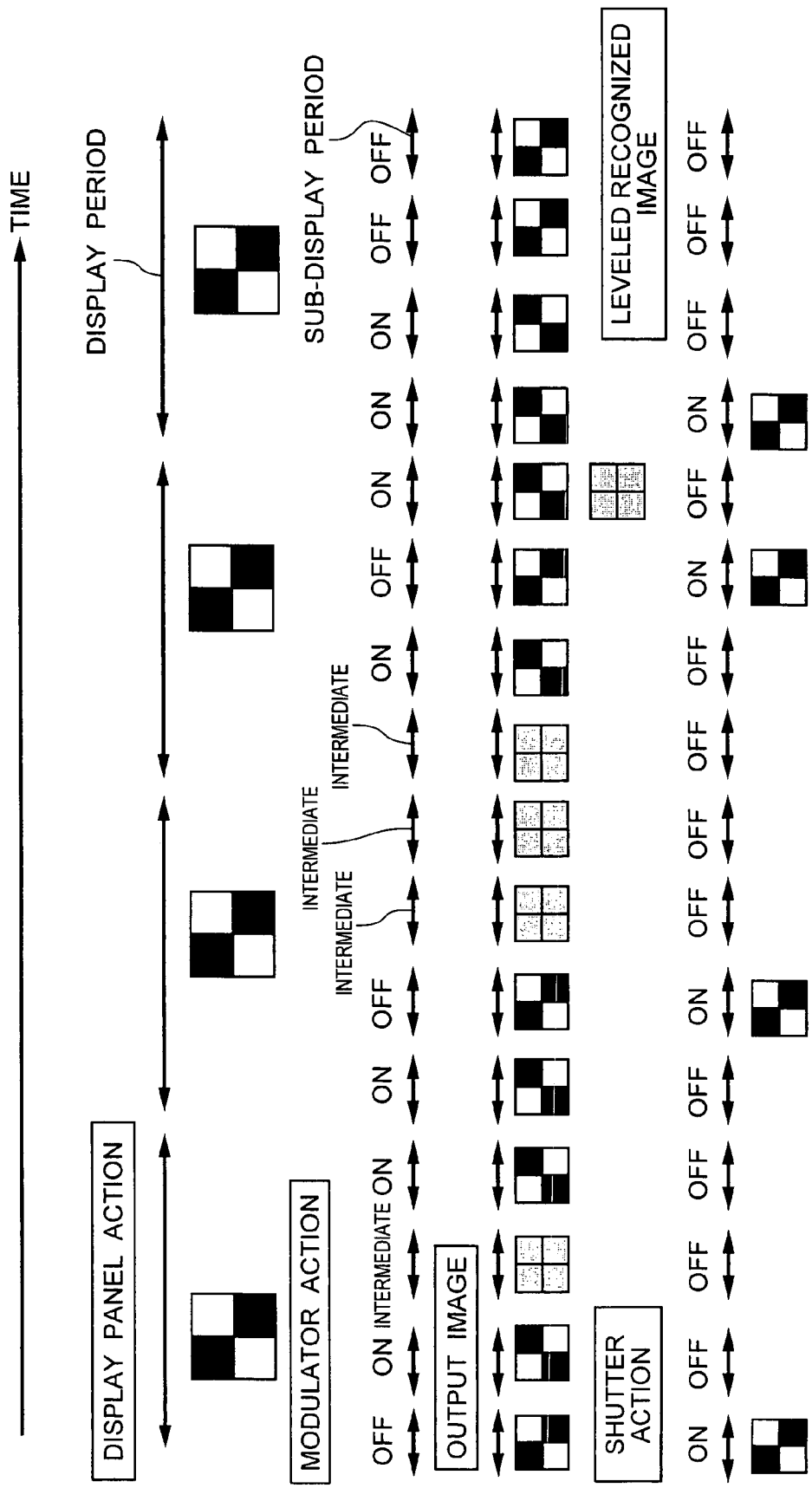
FIG. 11 is a timing chart for showing the display action (second example) of the sixth embodiment of the display device according to the present invention.

Referring to FIG. 10, it has been described by using the binary signals. However, as it is easily recognized, the embodiment can also be applied to the case where the modulator takes three values such as the on-, off-, and intermediate states as shown in FIG. 2. Further, FIG. 10 shows the case where the sub-display period is a half the display period. However, the embodiment can also be applied to the case where the sub-display period is one n-th (where, n is an integer of 3 or larger) of the display period. FIG. 11 shows an example of the case where the modulator takes three states (on, off, and intermediate), and the sub-display period is one fourth of the display period. In this case, the display image cannot be read unless the shutter operates at the same frequency and same timing.

Figure 12:
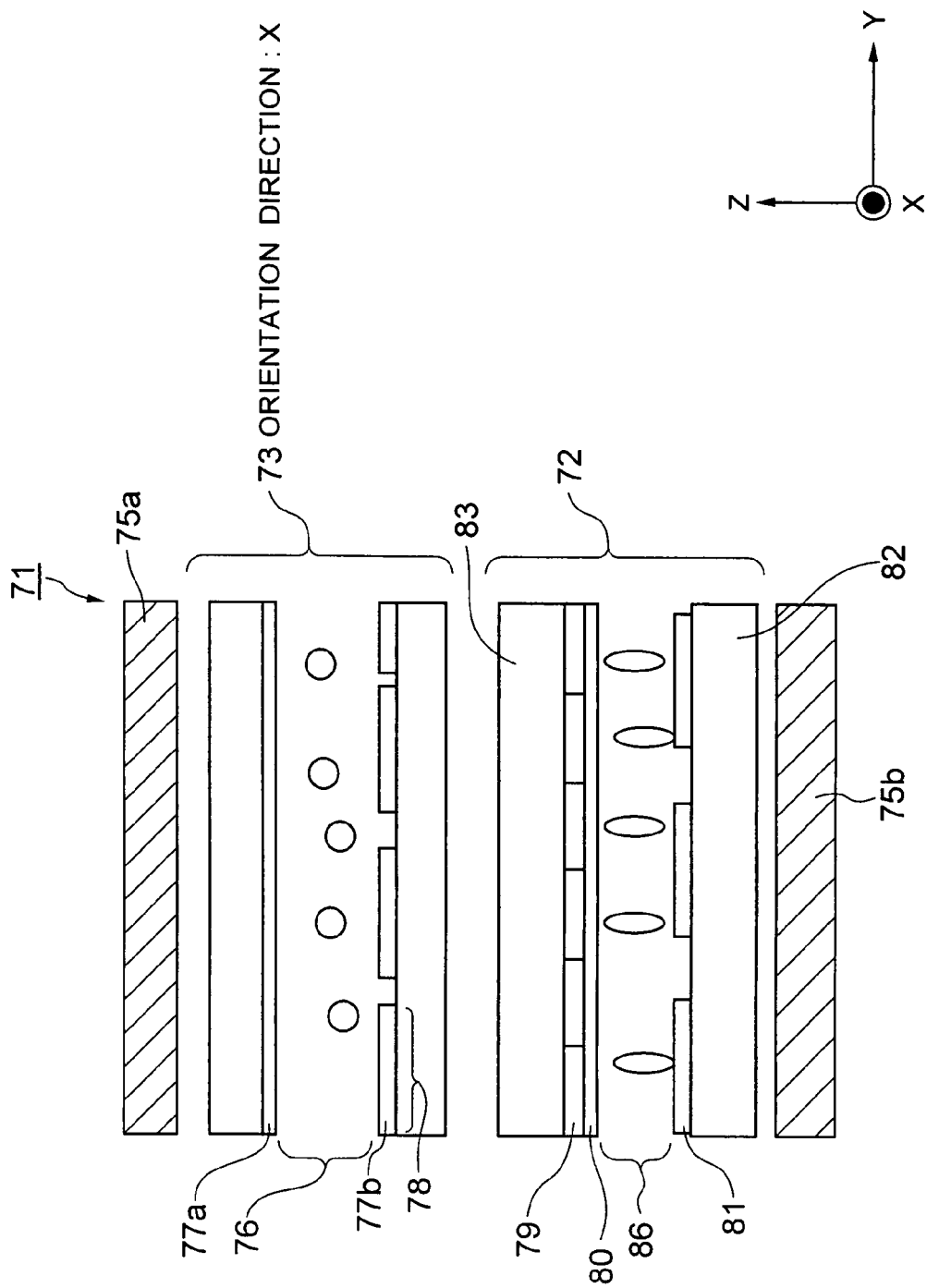
FIG. 12 is a schematic cross section for showing a seventh embodiment of the display device according to the present invention.

FIG. 12 is a schematic cross section for showing a seventh embodiment of the display device according to the present invention. An explanation will be provided hereinafter by referring to this drawing.

There are also cases where the image can be recognized even under the concealed mode of FIG. 3. A different image can be recognized when the liquid crystal display device is viewed from an oblique direction. This is a phenomenon widely known as the viewing angle dependency of the liquid crystal display device. The first sub-display period and the second sub-display period of FIG. 3 have different viewing angle dependencies since they have different orientation states of the liquid crystals. Therefore, when the image is observed from a specific oblique direction, the image can be recognized slightly.

This embodiment is characterized that a modulator 73 is divided into a plurality of segments (segment patterns 78), and changes the segment to perform modulating action or the modulation amount thereof for each modulation period. That is, the segment patterns 78 are provided in the modulator 73. There may be a plurality of kinds of segment patterns 78. Further, the modulation amounts on each segment pattern 78 may differ from each other. Furthermore, the modulation amount of each segment pattern 78 may be changed with time. With this, when the shutter is not used, there is viewed an image in which a modulator pattern is superimposed on the display panel image. Like this, a more complicated display image can be formed, so that it becomes possible to increase the effect of concealing characteristic.

In FIG. 12, used is a display panel 72 in which a TFT array substrate 82 and a color filter substrate 83 are laminated through a vertically oriented liquid crystal layer 86. A modulator 73 is stacked on the display panel 72. A parallel-oriented liquid crystal layer 76 is used for the modulator 73. The modulator 73 has a voltage-applying portion that is sectioned by the segment patterns 78. Each of the voltage-applying portions within the modulator 73 is provided with transparent electrodes 77a and 77b for applying the voltage to the liquid crystal layer 76. The liquid crystal layer 76 of the modulator 73 has a low-viscosity liquid crystal material being interposed so as to make the speed of on/off action at 1-2 milliseconds. Further, it is set to have a relatively thin gap value. However, it is possible to achieve the response speed of about 2 milliseconds relatively easily, because it is not twisted or through operating it with relatively a high voltage.

Figure 13:
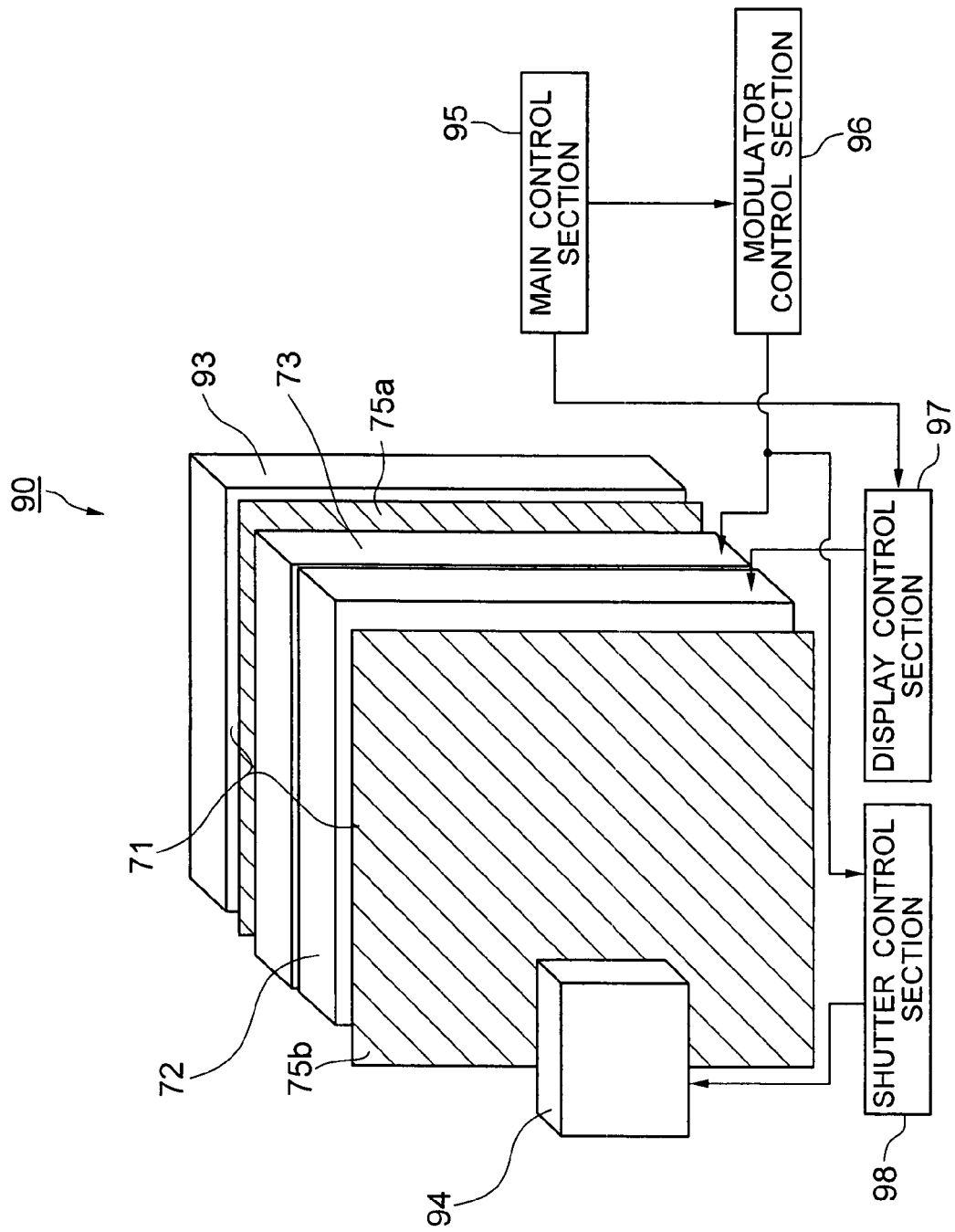
FIG. 13 is a schematic perspective view for showing the seventh embodiment of the display device according to the present invention.

Such display unit 71 as described above is placed over a backlight 93 as shown in FIG. 13. Further, the display panel 72, the modulator 73, and the shutter 94 are connected to each control section as shown in FIG. 13. As the shutter 94, it is possible to use an element in which a liquid crystal element such as the modulator 73 is sandwiched between two polarizing plates. With this, it is possible to achieve the response speed that is about the same as that of the modulator 73.

A main control section 95 generates binary random signals for the modulator 73 and the shutter 94. These signals are sent to a modulator control section 96 to be boosted up to a prescribed voltage that is necessary to operate the modulator 73, and sent to the modulator 73 thereafter. Meanwhile, a part of the signals from the modulator control section 96 is sent to a shutter control section 98. The shutter control section 98 adjusts on/off of the time-series signals so that the shutter 94 is opened at the timing where the modulator 73 turns off. When the modulator 73 is a normally-off type, the binary signals of the time-series signals are inverted. In the meantime, when the modulator 73 is a normally-on type, the time-series signals pass therethrough in the original state. As described, the time-series signals are boosted up to a prescribed voltage and supplied to the shutter 94 after the action timing of the shutter 94 is adjusted.

With the above-described structure, the action of FIG. 10 can be performed. It is set in such a manner that the main control section 95 becomes synchronized with the scan timing of the display control section 97, the random signal comes in match with the display period in a two-cycle period, and a complement of the value in the first half of the two-cycle period becomes the value of the latter half.

For example, here is considered a case where following random numbers are generated in the main control section 95.

{1, 0, 1, 0, 1}

Complementary numbers are inserted between each values of the random number sequence. With this, the value 1 is converted to {1, 0} and the value 0 is converted to {0, 1}. Thus, the sequence of the above-described case is converted as follows.

{1, 0, 0, 1, 1, 0, 0, 1, 1, 0}

In this manner described above, the sequence for operating the modulator 73 can be obtained. Further, drive operation of the case in FIG. 11 can be achieved by finding a sequence with three values in the same manner.

Next, an eighth embodiment of the display device according to the present invention will be described. This embodiment uses a polymer dispersion type liquid crystal as the modulator, instead of the parallel-oriented liquid crystal layer shown in FIG. 12. This polymer dispersion type liquid crystal can be obtained by placing a mixture of a photo-curing resin and a liquid crystal material between two substrates, and photo-curing it thereafter. After completing the photo-curing, the photo-curing resin turns to a polymer matrix and the liquid crystal material precipitates as liquid crystal droplets. Birefringence is generated when the liquid crystal droplets are larger than the visible light wavelength. Further, there generates the depolarization characteristic since the orientation of the liquid crystal droplets is random.

When a voltage is applied to such polymer dispersion type liquid crystal element described above, the liquid crystal within the liquid crystal droplet is oriented in the direction of the electric field. Therefore, the birefringence distribution within the substrate is decreased and the depolarization characteristic is lost.

The normally well-known polymer dispersion type liquid crystal is formed with a large cell gap to obtain a large scattering characteristic. Meanwhile, the embodiment requires only the depolarization characteristic that can achieve high-speed modulation. Therefore, it can be formed with a relatively thin cell gap and operated at a high speed.

Figure 14:
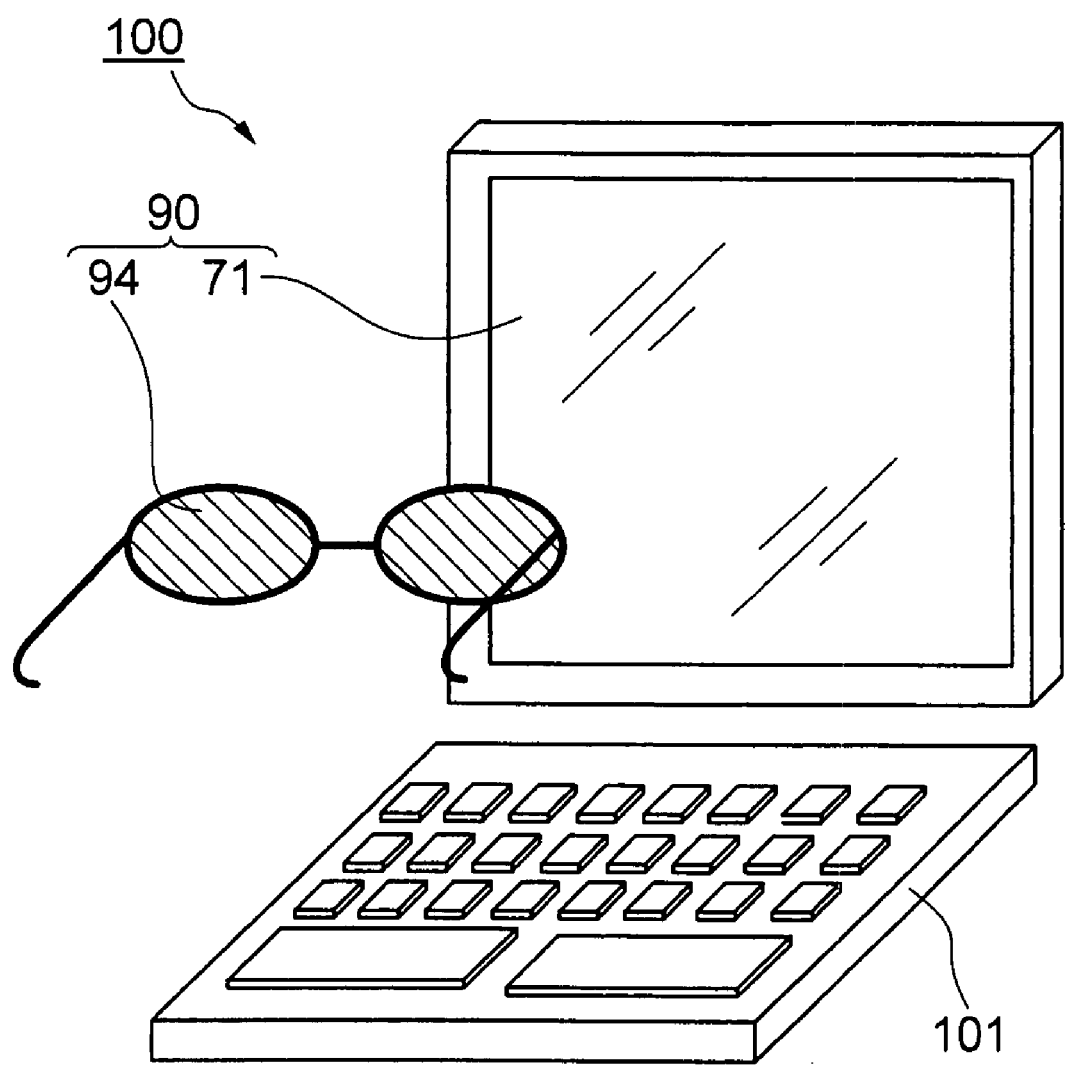
FIG. 14 is a perspective view for showing an embodiment of a terminal according to the present invention.
Figure 15:
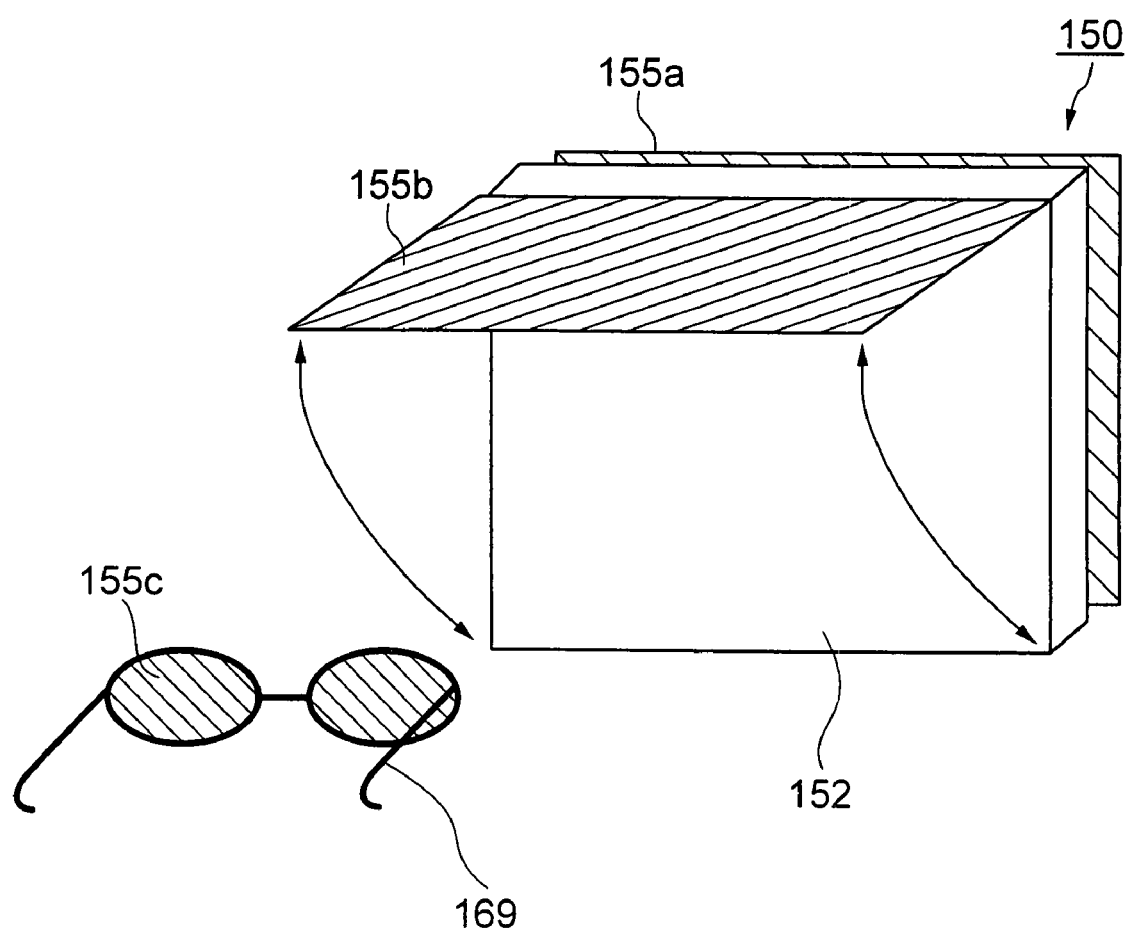
FIG. 15 is a perspective view for showing a conventional technique disclosed in Patent Document 1.
Figure 16:
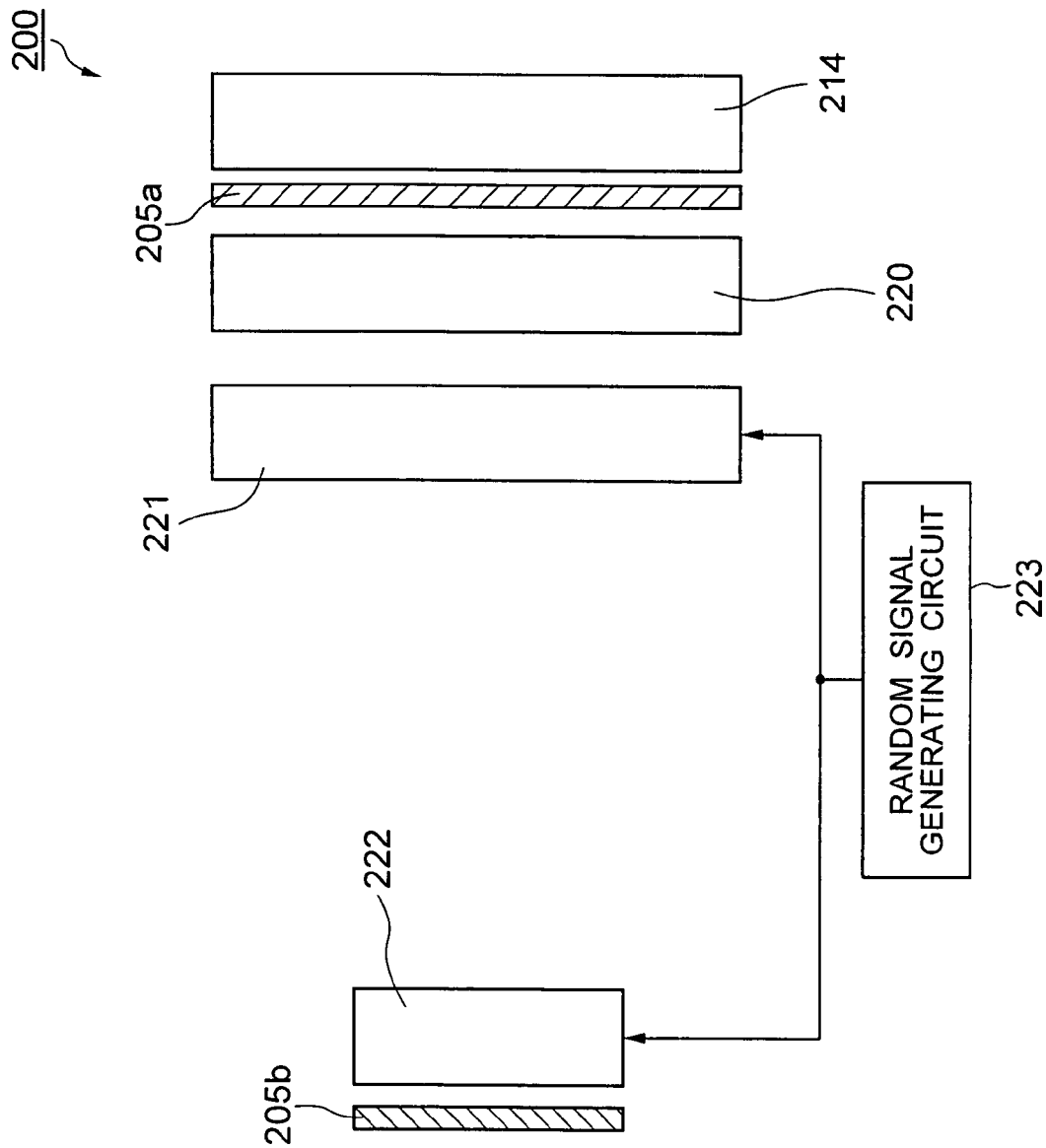
FIG. 16 is a cross section for showing a conventional technique disclosed in Patent Document 2.
Figure 17:
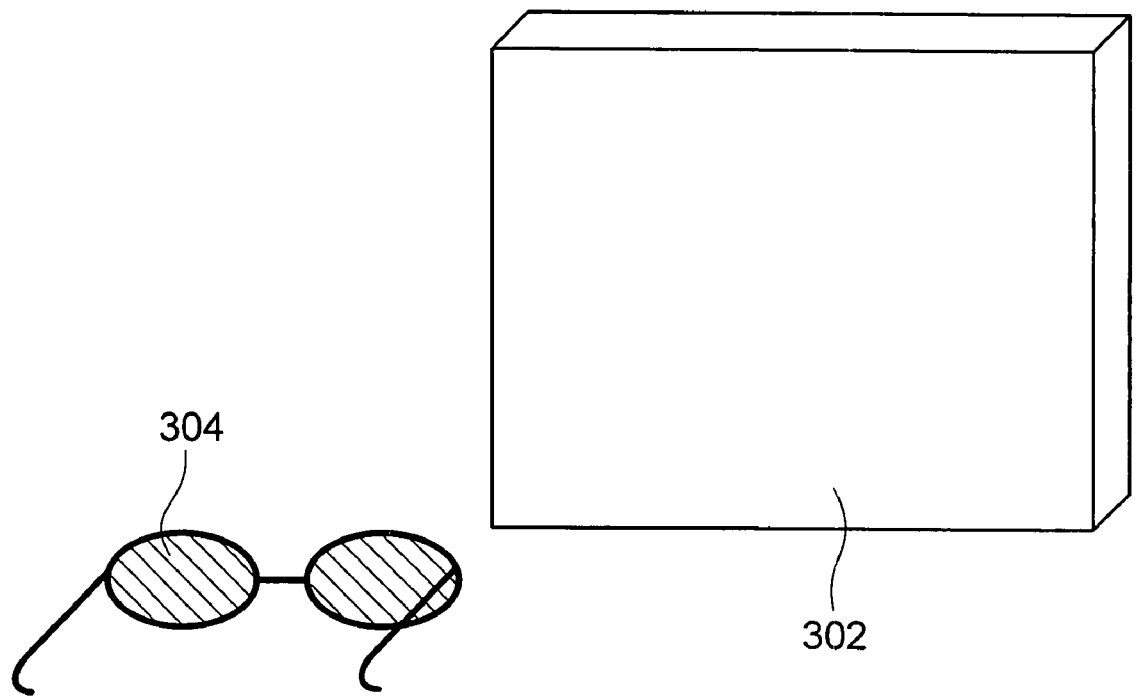
FIG. 17 is a perspective view for showing a conventional technique disclosed in Patent Document 3.

FIG. 14 is a perspective view for showing an embodiment of a terminal machine according to the present invention. An explanation will be provided hereinafter by referring to this drawing.

A terminal machine 100 of this embodiment comprises a display device 90 of FIG. 13 and a main body 101 that is constituted with a keyboard, a microcomputer, and the like. The shutter 94 is formed in an eyeglass type. The display unit 71, the shutter 94, and the main body 101 can exchange synchronizing signals and the like with each other through radio or wire communication. The terminal 100 may be a fixed apparatus such as an ATM or EWS, or may be a portable device such as a portable information terminal or a portable telephone.

What is claimed is:

1. A sight controllable display device, comprising:
two polarizing plates;
a display panel provided between the two polarizing plates;
a modulator provided between the display panel and either one of the two polarizing plates; and
an observing shutter,
wherein:
light is received by a first one of the two polarizing plates and then transmitted from a second one of the two polarizing plates to the observing shutter the display panel forms an image by changing transmittance of the light that transmits through the two polarizing plates;
the modulator repeats an inversion mode for inverting the image formed on the display panel and a noninversion mode for not inverting the image; and
the observing shutter is for observing the display panel, which repeats a translucent mode for transmitting the light and a shielding mode for not transmitting the light in connection with an action of the modulator.

2. The sight controllable display device as claimed in claim 1, wherein the observing shutter turns to the shielding mode when the modulator is in the inversion mode and turns to the translucent mode when the modulator is in the noninversion mode.

3. The sight controllable display device as claimed in claim 1, wherein the modulator repeats the inversion mode and the noninversion mode by modulating a birefringence amount or optical rotation property, which is added to the light prior to being provided to the display panel or the light that has been transmitted through the display panel.

4. The sight controllable display device as claimed in claim 1, wherein the modulator repeats the inversion mode and the noninversion mode by modulating a depolarization characteristic that is added to the light prior to being provided to the display panel or the light that has been transmitted through the display panel.

5. The sight controllable display device as claimed in claim 4, wherein the modulator is constituted with a compound of a liquid crystal and a polymer.

6. The sight controllable display device as claimed in claim 1, wherein the modulator is divided into a plurality of segments, and repeats the inversion mode and the noninversion mode for each of the segments.

7. The sight controllable display device as claimed in claim 1, wherein the modulator repeats the inversion mode and the noninversion mode in accordance with a sequence of two values or more.

8. A terminal, comprising the sight controllable display device as claimed in claim 1.

9. The sight controllable display device as claimed in claim 1, wherein the modulator includes a plurality of segment patterns.

10. The sight controllable display device as claimed in claim 9, wherein modulation amounts in each of the plurality of segment patterns differ from each other.

11. The sight controllable display device as claimed in claim 10, wherein the modulation amounts differ with time.

* * * * *